M. M. HASTINGS.
APPARATUS FOR MEASURING THE HUMIDITY IN OR DETERMINING THE EVAPORATING POWER OF THE AIR.
APPLICATION FILED SEPT. 22, 1908.
911,875.
Patented Feb. 9, 1909.
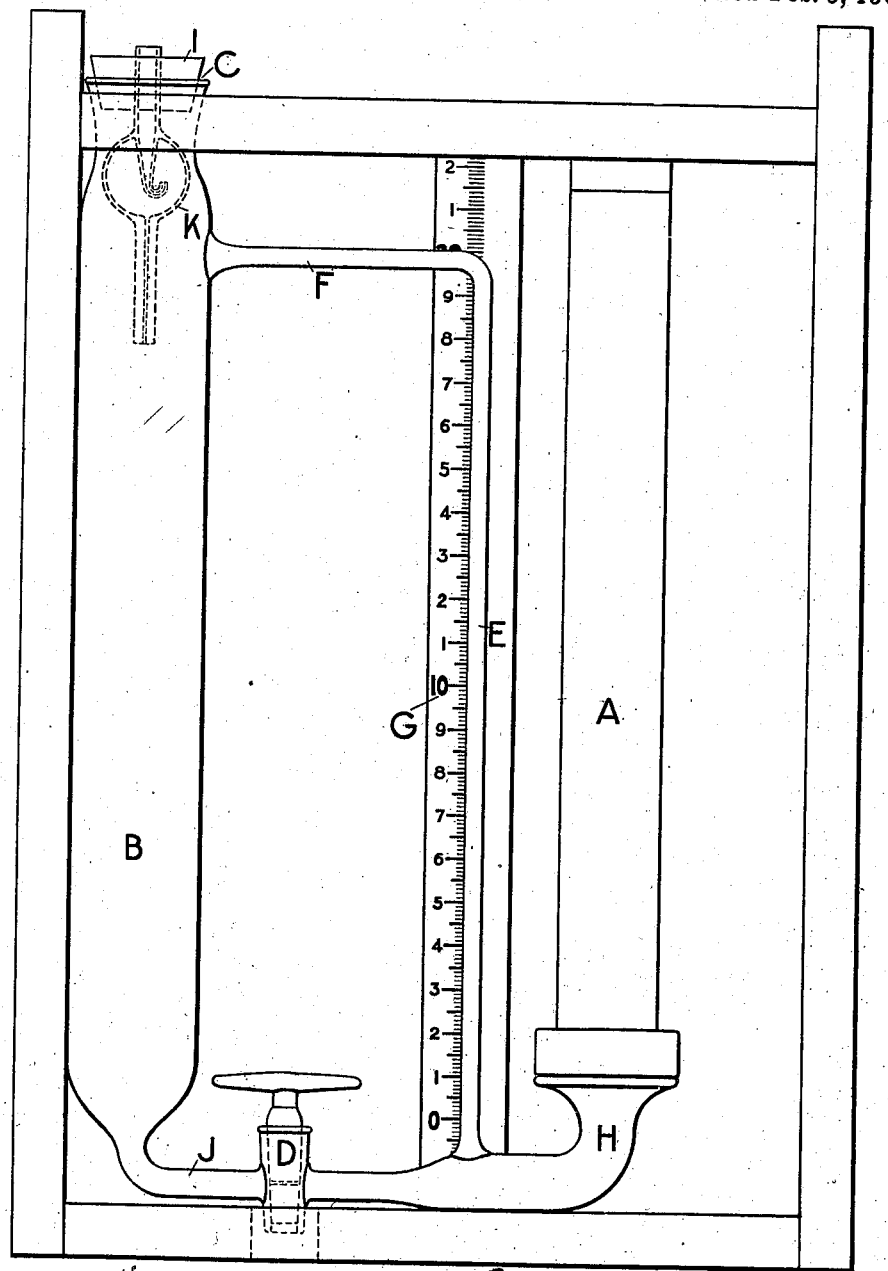

UNITED STATES PATENT OFFICE.

MILO M. HASTINGS, OF WASHINGTON, DISTRICT OF COLUMBIA.

APPARATUS FOR MEASURING THE HUMIDITY IN OR DETERMINING THE EVAPORATING POWER OF THE AIR.

No. 911,875.  Specification of Letters Patent.  Patented Feb. 9, 1909.

Application filed September 22, 1908. Serial No. 454,280.

(DEDICATED TO THE PUBLIC.)

*To all whom it may concern:*

Be it known that I, MILO M. HASTINGS, an employee of the Department of Agriculture, and a legal resident of the State of Kansas, at present residing in the city of Washington, District of Columbia, whose post-office address is No. 1733 Twentieth street, northwest, in said city and District, have invented a new and useful Apparatus for Measuring the Humidity in or Determining the Evaporating Power of the Air.

This application is made under the act of March 3, 1883, chapter 143 (22 Stat., 625), and the invention herein described and claimed may be used by the Government of the United States or any of its officers or employees in the prosecution of work for the Government or by any person in the United States, without payment to me of any royalty thereon.

This invention relates to atmospheric humidity and is adapted for use in measuring the humidity in, or determining the evaporating power of, the air.

The object of the invention is to produce a humidity measuring instrument that will meet the needs of the cold storage industry.

Heretofore, no satisfactory device has been perfected for determining the humidity in the air under cold storage conditions and as a result, it frequently occurs that operators of cold storage plants sustain much loss due to wrong conditions of atmospheric moisture. When the air is too dry in cold storage rooms it is deleterious to various products, and when the air is too moist in such rooms, it is likewise injurious to certain commodities. Therefore, it is the purpose of my invention to afford a means for detecting and observing atmospheric humidity, in order that such conditions may be properly remedied, when necessary, so as to avoid any harmful and injurious effects to the products in cold storage.

The nature, characteristics and scope of the invention will be more readily understood from the following description taken in connection with the accompanying drawing, forming a part hereof, wherein is shown a front perspective view of the apparatus.

Referring to the drawing, A represents a porous porcelain tube, having an opening at the bottom thereof, and is attached at its bottom end by means of cement to a round glass tube H. The said glass tube H connects with a stop-cock, D, and is attached near its center to the glass tube E which runs perpendicularly with the scale, G, and is connected with a horizontal glass tube, F, of similar diameter, having an entrance to a glass tube, B, of larger circumference, which serves as a reservoir for retaining the fluid used in practicing my invention. The reservoir B has an opening at its top, C, so as to permit the fluid to be poured therein. This opening, C, is closed by means of a check bulb K fitted into a rubber stopper, I, and when placed in the opening, C, it allows freedom of air pressure without permitting leakage of the liquid contained in the reservoir, B. The reservoir, or larger glass tube, B, at its lower end, forms a part of and has opening into a smaller glass tube, J, and the tube, J, is connected to the stop-cock, D. The purpose of the stop-cock D is to check the flow of liquid from the glass tube J to the glass tube H, the two tubes being intersected by the stop-cock D, as shown in the accompanying drawing.

G is the scale placed behind the glass tube E and its use is to facilitate the reading of any change in the volume of liquid contained in the said tube, though the glass tube E may be graduated, so as to record any change in the liquid.

In operating the said apparatus, I fill the reservoir B approximately three-fourths full with a desired strength of aqueous sulfuric acid or other aqueous solution, and then tip the device back and forth so as to allow the liquid to run into and completely fill the porcelain tube A and the reading tube E. When this action is accomplished the stop-cock D is closed and the instrument may be placed in a working position. By carefully opening the stop-cock D the liquid may be drawn back into the reading tube E and set at any desired point. The instrument is now complete and in a proper condition for being set in the room the humidity of which it is desired to control. If the humidity is less than desired, the vapor pressure of the liquid in the machine will be greater than the vapor pressure of the moisture in the air, and evaporation will take place from the porcelain tube A. This action will cause a negative movement of the liquid in the reading tube E, thereby indicating that more moisture should be supplied the room. If the humidity of the room is greater than desired, the vapor pressure of the moisture in the air will be greater than the vapor pressure of the liquid in the instrument, and moisture will be absorbed from the air by the liquid in the porcelain tube A. This will cause a positive movement of the liquid in the reading tube E toward the reservoir or large glass tube B, thereby indicating that less moisture should be supplied to the room. If the room has the desired degree of moisture, neither evaporation nor absorption takes place, and the liquid in the tube E remains stationary.

I do not confine myself to the sole use of aqueous sulfuric acid in practicing my invention, but any other aqueous solution possessing similar properties may be used in obtaining the same desired results.

Having thus described my invention, I claim:

1. An apparatus having a porcelain tube A, glass tubes H, J, E, and F, of small circumference, and a glass tube, B, of large circumference with an opening at its top for receiving fluid and a stopper for closing said opening, the glass tubes F and E being arranged so as to connect the glass tube B with the glass tube H, thereby permitting the flow of fluid from one tube to the other, substantially as described.

2. An apparatus having a porcelain tube A, glass tubes H, J, E, and F, of small circumference, and a glass tube, B, of large circumference with an opening at its top for receiving fluid and a stopper for closing said opening, the glass tubes F and E being arranged so as to connect the glass tube, B, with the glass tube, H, thereby permitting the flow of fluid from one tube to the other, and a stop-cock to regulate such flow, substantially as specified.

3. An apparatus having a porcelain tube A, glass tubes H, J, E, and F, of small circumference, and a glass tube, B, of large circumference with an opening at its top for receiving fluid and a stopper for closing said opening, a stop-cock intersecting the glass tubes J and H, and the glass tube J being arranged so as to connect the glass tube B with the tube H, thereby permitting the flow of fluid from one tube to the other, substantially as specified.

4. An apparatus having a porcelain tube A, glass tubes H, J, E, and F, of small circumference, and a glass tube, B, of large circumference with an opening at its top for receiving fluid and a stopper for closing said opening, the tubes F and E being arranged so as to connect the tube, B, with the tube, H, thereby permitting the flow of fluid from one tube to the other, and the tubes containing fluid for determining the evaporating power of air, and a scale plate provided with graduations for indicating variations in the volume of said fluid whereby the humidity of the air may be determined, substantially as specified.

In testimony whereof I affix my signature in the presence of two subscribed witnesses.

MILO M. HASTINGS.

Witnesses:
  ROB R. SLOCUM,
  G. ARTHUR BELL.